United States Patent Office 3,468,090
Patented Sept. 23, 1969

3,468,090
CONSTRUCTIONAL ELEMENT AND METHOD OF MAKING THE SAME
Robert L'Hermite, 4–6 Boulevard Maillot, Paris, France
Filed Nov. 24, 1965, Ser. No. 511,582
Claims priority, application France, Nov. 25, 1964,
996,179
Int. Cl. E04b *1/04;* B29c *1/00*
U.S. Cl. 52—309                                      8 Claims

ABSTRACT OF THE DISCLOSURE

A reinforced concrete structure is provided which comprises a central core of concrete and at least one external continuous metal reinforcement. An adhesive of high strength having in hardened state a modulus of elasticity greater than 20,000 kg./cm.$^2$ and an elongation on rupture less than 1% is interposed between the adjacent surfaces of the concrete core and the external metal reinforcement and adheres the core and the metal reinforcement to each other along substantially the entire adjacent surfaces thereof.

---

Figure 2:
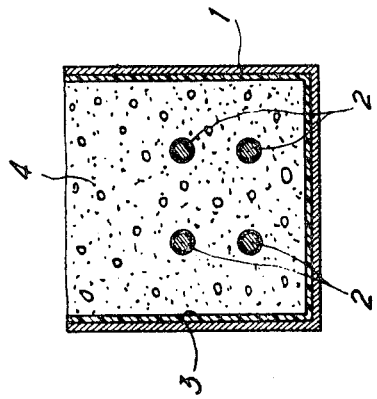

It is well known that traditional construction materials such as members of hydraulic concrete as well as masonry built with conventional lime-based or hydraulic cement mortars have a tensile strength which is much lower than their compressive strength, this appreciably limiting their capacity to withstand tension, bending and shear forces.

For hydraulic concrete, it has become the current practice to remedy this failing either by reinforcing the concrete by incorporating in its mass metal reinforcing member (smooth round bars, ribbed bars, trellis-work, expanded metal), or by pre-compressing the concrete (pre-stressed concrete) by means of wires, usually metal, under tension. Thus, union of the reinforcing members with concrete along the whole length of the reinforcing members is ensured by immersing the reinforcing members in the mass of concrete before it sets.

The present invention essentially relates to a new method of associating metal reinforcing members with constructional members, particularly of concrete, by bonding the reinforcing members to the exterior of the constructional members by means of a high strength adhesive having a shear strength at least equal to the tensile strength of the material of the constructional member.

The present invention relates equally, by way of new industrial products, to constructional members having external reinforcing members adhesively bonded to them in accordance with the invention.

The present invention also concerns methods of fabrication, particularly pre-fabrication in the factory of such constructional members.

Preferably, there are used for the assembly of the reinforcing members adhesives based on "epoxy" resins which resist the effects of water and humidity and high temperatures up to 150° C.

In a general manner, the applicants have determined that the adhesive used to effect the bond between the concrete and the reinforcing members should have, in the hardened condition, a modulus of elasticity at least equal to 20,000 kg./cm.$^2$ and an elongation on rupture at most equal to 1%.

For example, the following three compositions may be given by way of example.

COMPOSITION A

Adhesive EC 1294, Minnesota Company of France.
Amount:
    75 of silica (percent by weight of the adhesive)
    27.5 of Latexyl (percent by weight of the adhesive)
    3.5 of Thixofix (percent by weight of the adhesive).

COMPOSITION B

Adhesive EC 1751 Minnesota Company of France (optionally with silicious additions).

COMPOSITION C

Eponal adhesive 120 A82, Sonal Company.

The invention will be better understood on examining the examples given below which relate to different modes of putting the invention into effect.

Construction of a concrete beam of hydraulic cement "reinforced by adhesive bonding."

The beam, freely supported on abutments at its two ends is intended to work under a bending moment.

The reinforcement members are formed:

For resisting the bending moment (longitudinal reinforcement), by a plate of steel adhesively bonded over the whole internal surface of the beam, and of which the thickness is a function of the section of steel required (calculated from the bending moment's curve).

For the resistance to splitting forces by transversely bands or strips of steel, of appropriate section bonded onto the lateral faces, which may completely surround the beam.

The normal rules for the calculation of reinforced concrete enable the calculations to be made, taking into account the elastic characteristics of the steel being used, of the sections of steel necessary for the longitudinal reinforcements and the transverse reinforcements.

By way of example, a beam of 2.80 metres in length, 0.15 metres in width, and 0.25 metres in height breaks, in accordance with calculation, under the effect of a concentrated load of about 9 metric tons when it is reinforced with a sheet of mild steel of 0.006 metres in thickness bonded over the whole of its lower surface, and of straps formed of sheet mild steel of 0.003 metres in width and 0.001 metres in thickness.

EXAMPLE II

Formation of nozzles, conduits and reservoirs of concrete "reinforced by adhesive bonding."

When they are to contain moving or static liquid, these structures must be reinforced to withstand the tensile forces caused by the dynamic or static pressure of the liquid.

In accordance with the present invention, the reinforcement is formed by a sheet of steel (or any other metal) wrapped around the external surface and adhesively bonded; the calculation of the section of steel is made in accordance with the usual rules for calculation of reinforced concrete.

EXAMPLE III

Construction of beams of various materials (as described above) reinforced with pre-tension.

Before bonding, the reinforcement is subjected to a tensile force by any process and after hardening of the adhesive, this force is removed. The member thus reinforced is subjected to a pre-stress force which improves its resistance to certain types of constraints.

The invention relates to a method of making such members in the factory, which is much more advantageous than fabrication in the open, the method consisting in adhesively bonding reinforcements onto a conventional constructional member, for example a concrete beam.

More precisely, the invention provides a method of fabrication of concrete constructional members, reinforced by adhesive bonding in accordance with the invention, consisting essentially in setting up shuttering of appropriate form, placing in the shuttering metal reinforcements which are coated before or after this positioning, and on their faces turned towards the interior, with a "high strength" adhesive specially chosen to adhere in damp surroundings, in flowing the concrete into the shuttering between the reinforcements or onto the reinforcements, allowing the concrete to set and the adhesive to harden, and in finally proceeding to remove the shuttering from the constructional member.

In an extremely advantageous variant of the method, the shuttering serves as external reinforcement, particularly as reinforcement resisting the splitting forces in the case of beams or similar members.

In accordance with this variant, in a hollow reinforcement-shuttering provided with at least one opening extending the whole length of its upper part, there is placed at least one longitudinal tensile reinforcement, the internal surface of the reinforcement-shuttering and each tensile reinforcement is covered with a high strength adhesive capable of setting in damp and basic surroundings, then concrete is poured into the interior of the reinforcement-shuttering, setting of the concrete and hardening of the adhesive taking place simultaneously.

SUMMARY OF THE INVENTION

According to the present invention a construction member of reinforced concrete is provided which comprises, in combination a central core of concrete, and at least one external continuous metal reinforcement, preferably consisting of a steel sheet, whereby the uniform bonding of the core and the reinforcement is effected by way of an adhesive of high strength interposed between substantially in entire adjacent surfaces of the core and the reinforcement and having, in hardened state, a modulus of elasticity greater than 20,000 kg./cm.$^2$ and an elongation on rupture less than 1%. Preferably the adhesive is an epoxy resin having, before hardening, a viscosity lower than 150 poises and an epoxy index of about 190.

Figure 3:
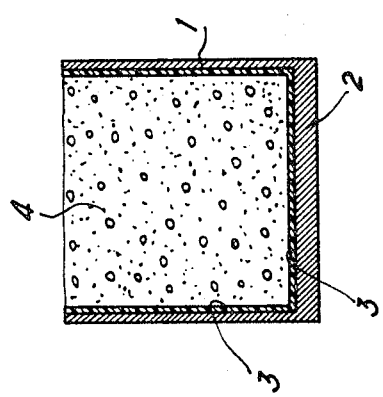
Figure 1:
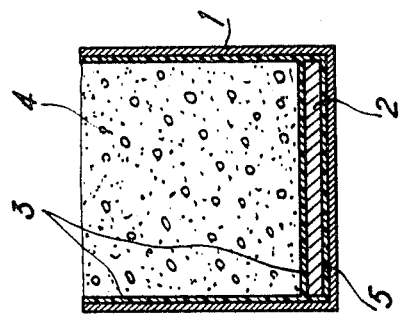

FIGURES 1, 2 and 3 show diagrammatically in section the beams produced. In the three cases, the reinforcement-shuttering is indicated 1, each tensile reinforcement 2, the high strength adhesive 3 and the concrete 4.

In the embodiment of FIGURE 1, the reinforcement-shuttering is a sheet folded into a U, for example a steel sheet of 1 mm. in thickness or a sheet in light alloy of 2 mm. in thickness. The longitudinal reinforcement 2, adhesively bonded to the bottom of the reinforcement-shuttering 1 by a bed of adhesive 5, is a sheet of steel of 2 to 10 mm. in thickness.

In the embodiment shown in FIGURE 2, there are four round concrete reinforcing rods 2 of steel embedded in the concrete.

In the embodiment shown in FIGURE 3, the reinforcement 2 forms an integral part of the bottom of the reinforcement-shuttering 1.

The applicants have made a particular study of the high strength adhesives to be used, so as to arrive at the following conclusions:

The adhesive to be used has advantageously a base of epoxy resin; it is then convenient that its viscosity should be less than 150 poises and its epoxy index about 190.

The hardener is then preferably a polyamine product of amine index between 1,000 and 1,500; in this case, the process is accelerated by a tridimethylaminomethylphenol or similar product.

In accordance with the partirular case, the basic binder may be charged either with a silicious filler to a value lying between 25 and 50%, or of a silicious filler and of a quantity of larger particles of silica (up to a maximum particle diameter of 1.2 mm.) and this up to a value of 300%. In the case of application to a vertical surface a thixotropic agent is added in sufficient quantity.

In any case, in addition to what has already been said, the hardened material should not have a modulus of elasticity lower than 20,000 kg./cm.$^2$ and an elongation on rupture greater than 1%.

Constructional members, particularly of concrete, reinforced by adhesive bonding in accordance with the invention and comprising an external reinforcement to resist the splitting forces and preferably at least one internal tensile reinforcement, present in relation to conventional reinforced construction members many advantages.

A first advantage is formed by a gain in weight, for equal strength; this weight gain may be up to 10 to 20%. In fact, in the case of embedded reinforcements, the whole of a portion of the material (concrete) used serves in practice only to cover the reinforcements, at the periphery of the construction member. With adhesively bonded reinforcements according to the invention all this covering zone becomes superfluous giving rise to the abovementioned lightening of the member.

A second advantage of the members in accordance with the invention resides in the fact that their reinforcements are visible and insulated from the concrete, one can therefore easily control their state, particularly from corrosion, and there is no risk of seeing them corroded by certain additives added to the concrete.

A third advantage of the construction members in accordance with the invention resides in the fact that the use of external reinforcements, for example corner members at the angle of a block, gives to the members extremely accurate sides, which is extremely useful, particularly in prefabrication, while avoiding chipping.

I claim:

1. An elongated constructional element if reinforced concrete comprising a core of concrete, a continuous reinforcement-shuttering surrounding the core of concrete and serving to withstand splitting forces, and a longitudinal tensile reinforcement placed in the interior of the reinforcement-shuttering, bonding of the concrete and the reinforcements being effected with the aid of a high strength adhesive interposed between substantially the entire adjacent surfaces of said core and said reinforcement and having, in the hardened condition, a modulus of elasticity greater than 20,000 kg./cm.$^2$ and an elongation on rupture of less than 1%.

2. An elongated construction element as defined in claim 1, wherein said reinforcements consist essentially of steel.

3. A member according to claim 1, in which the reinforcement-shuttering is a sheet folded into a U-shape and the tensile reinforcement is a strip of steel of 2 to 10 mm. in thickness.

4. A member according to claim 3, in which the strip of steel is adhesively bonded to the bottom of the U-shaped reinforcement-shuttering.

5. A member according to claim 3, characterised in that the adhesive is an epoxy resin having, before hardening, a viscosity less than 150 poises and an epoxy index of about 190.

6. A member according to claim 3, in which the tensile reinforcement is integral with the reinforcement-shuttering.

7. A method for the fabrication of concrete constructional members reinforced by adhesive bonding, consisting essentially in setting up shuttering of appropriate shape, positioning in the shuttering metal reinforcements which are covered before or after being placed in position and at least their surface facing towards the interior, with a "high strength" adhesive, flowing concrete into the shuttering between the reinforcements, allowing the concrete to set and the adhesive to harden, and finally removing the constructional member from the shuttering.

8. A method for the fabrication of a reinforced concrete constructional member in which, in a hollow reinforcement-shuttering provided with at least one opening extending along the whole length of its upper part, there is placed at least one longitudinal tensile reinforcement, the internal surface of the reinforcement-shuttering and each tensile reinforcement is covered with a high strength adhesive capable of setting in damp and basic surroundings, and concrete is poured into the interior of the reinforcement-shuttering, setting of the concrete and hardening of the adhesive being simultaneous.

References Cited

UNITED STATES PATENTS

| | | | |
|---|---|---|---|
| 1,794,079 | 2/1931 | Kellett | 52—724 |
| 2,921,463 | 1/1960 | Goldfein | 52—723 |
| 3,271,917 | 9/1966 | Rubenstein | 52—724 |

FOREIGN PATENTS

| | | |
|---|---|---|
| 595,000 | 9/1925 | France. |
| 1,066,006 | 9/1959 | Germany. |
| 809,050 | 2/1959 | Great Britain. |
| 910,631 | 11/1962 | Great Britain. |
| 210,311 | 11/1938 | Switzerland. |

OTHER REFERENCES

Rothenstein, Guy G., Epoxy Plastics in Architecture, Progressive Architecture, August 1959, p. 138–141, copy ir group 52–309.

Engineering News-Record, Oct. 10, 1963, p. 208, copy in group 52–309.

HENRY C. SUTHERLAND, Primary Examiner

U.S. Cl. X.R.

52—724, 732; 264—135, 256, 265, 268